US012223438B2

(12) United States Patent
Singh et al.

(10) Patent No.: US 12,223,438 B2
(45) Date of Patent: Feb. 11, 2025

(54) MITIGATING REGRESSION TEST VARIABILITY

(71) Applicant: International Business Machines Corporation, Armonk, NY (US)

(72) Inventors: Sweta Singh, Bangalore (IN); Manish Anand, Irving, TX (US); Vaibhav Murlidhar Kulkarni, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1169 days.

(21) Appl. No.: 16/936,549

(22) Filed: Jul. 23, 2020

(65) Prior Publication Data

US 2022/0027754 A1   Jan. 27, 2022

(51) Int. Cl.
*G06N 5/04*       (2023.01)
*G06N 20/00*      (2019.01)
*G06N 99/00*      (2019.01)

(52) U.S. Cl.
CPC ............. *G06N 5/04* (2013.01); *G06N 20/00* (2019.01); *G06N 99/00* (2013.01)

(58) Field of Classification Search
CPC ........... G06N 5/04; G06N 20/00; G06N 99/00
See application file for complete search history.

(56) References Cited

U.S. PATENT DOCUMENTS

| 10,127,146 | B2 | 11/2018 | Moretto |
| 2007/0250476 | A1 | 10/2007 | Krasnik |
| 2008/0109790 | A1 | 5/2008 | Farnham |
| 2014/0236486 | A1 | 8/2014 | Leseur |
| 2017/0097882 | A1* | 4/2017 | Chakraborty ....... G06F 11/3688 |
| 2017/0139819 | A1* | 5/2017 | D'Andrea ........... G06F 11/3692 |
| 2019/0015572 | A1 | 1/2019 | Revankar |

(Continued)

FOREIGN PATENT DOCUMENTS

| CN | 106529734 A | 3/2017 |
| JP | H09-293030 A | 11/1997 |

OTHER PUBLICATIONS

Lin, Tzu-Chi. Day 3—K-Nearest Neighbors and Bias-Variance Tradeoff. 30 days of Machine Learning. 2018 (Year: 2018).*

(Continued)

*Primary Examiner* — Alexey Shmatov
*Assistant Examiner* — Robert Bejcek, II
(74) *Attorney, Agent, or Firm* — Randy Tejeda

(57) ABSTRACT

One or more computer processors identify one or more similar, historical regression tests and historical builds utilizing a computed similarity measure between a regressed build and one or more historical builds conducted on a same release cycle, wherein the identified one or more similar historical regression tests and historical builds are K closest neighbors to the regressed build; predict an elapsed time of the one or more profiled regression tests utilizing a KNN algorithm comprising the K closest neighbors each weighted by a corresponding average distance from a test point and the elapsed time as a target variable; responsive to the predicted elapsed time exceeding an actual elapsed time associated with the regressed build, determine that the regressed build is an actual regression; responsive to determining that the regressed build is not due to variability, apply one or more mitigation actions to the regressed build.

20 Claims, 6 Drawing Sheets

(56) References Cited

U.S. PATENT DOCUMENTS

2019/0266015 A1    8/2019   Chandra
2019/0354388 A1   11/2019   Mitra

OTHER PUBLICATIONS

Evans et al. Comprehensive Resource Use Monitoring for HPC Systems with TACC Stats. 2014 First International Workshop on HPC User Support Tools. (Year: 2014).*
Zhang et al., "Diagnosing Performance Variations in HPC Applications Using Machine Learning", Conference Paper May 2017, DOI: 10.1007/978-3-319-58667-0_19, 19 pages.
Bhatele et al., "The Case of Performance Variability on Dragonfly-based Systems", Printed Mar. 26, 2020, 10 pages.
"Patent Cooperation Treaty PCT Notification of Transmittal of the International Search Report and the Written Opinion of the International Searching Authority, or the Declaration", Applicant's file reference F21W9435, International application No. PCT/CN2021/107006, International filing date Jul. 19, 2021 (Jul. 19, 2021), 9 pages.
Japan Patent Office, "Notice of Reasons for Refusal," Nov. 26, 2024, 6 Pages, JP Application No. 2023-504104.

* cited by examiner

| Elapsed Time | SKNN-Elapsed Time | SKNN-neighbor-1 | SKNN-distance-1 | SKNN-neighbor-2 | SKNN-distance-2 |
| --- | --- | --- | --- | --- | --- |
| 67.948 | 16.272 | 1 | 0.000 | 15 | 0.065 |
| 8.074 | 7.856 | 2 | 0.000 | 49 | 0.011 |
| 7.964 | 7.868 | 3 | 0.000 | 37 | 0.013 |
| 7.947 | 7.927 | 4 | 0.000 | 17 | 0.021 |
| 7.755 | 7.952 | 5 | 0.000 | 20 | 0.012 |
| 7.653 | 7.937 | 6 | 0.000 | 57 | 0.011 |
| 7.849 | 7.930 | 7 | 0.000 | 20 | 0.012 |
| 7.850 | 7.722 | 8 | 0.000 | 28 | 0.015 |
| 7.652 | 7.848 | 9 | 0.000 | 20 | 0.011 |
| 7.921 | 7.801 | 10 | 0.000 | 25 | 0.012 |
| 7.961 | 7.783 | 11 | 0.000 | 30 | 0.008 |
| 7.419 | 7.729 | 12 | 0.000 | 16 | 0.009 |
| 8.168 | 7.779 | 13 | 0.000 | 41 | 0.023 |
| 7.849 | 7.786 | 14 | 0.000 | 8 | 0.017 |
| 7.652 | 7.812 | 15 | 0.000 | 40 | 0.012 |
| 7.629 | 7.747 | 16 | 0.000 | 12 | 0.009 |
| 7.866 | 7.770 | 17 | 0.000 | 33 | 0.012 |
| 7.758 | 7.678 | 18 | 0.000 | 26 | 0.010 |
| 8.005 | 7.852 | 19 | 0.000 | 50 | 0.013 |
| 7.874 | 7.791 | 20 | 0.000 | 35 | 0.007 |

FIG. 3

MITIGATING REGRESSION TEST VARIABILITY

BACKGROUND

The present invention relates generally to the field of machine learning, and more particularly to predicting and mitigating performance variability in regression testing.

Regression testing involves conducting a plurality of functional and non-functional tests to ensure that previously developed and tested software still performs appropriately after a modification or change. If software does not perform appropriately or performs at a reduced efficiency, this is a regression. Regression testing may trigger on bug fixes, software enhancements, configuration changes, and substitution of hardware.

K nearest neighbors algorithm (KNN) is a non-parametric method used for classification and regression, where an input consists of k closest training examples in a feature space. KNN is a type of instance-based learning where a function is only approximated locally, and all computation is deferred until function evaluation. For regression purposes (e.g., KNN regression), the output is the predicted value for the input, where said value can be an average or a median.

SUMMARY

Embodiments of the present invention disclose a computer-implemented method, a computer program product, and a system for predicting and mitigating variability in regression testing. The computer-implemented method includes one or more computer processors identifying one or more similar, historical regression tests and historical builds utilizing a computed similarity measure between a regressed build and one or more historical builds conducted on a same release cycle, wherein the identified one or more similar historical regression tests and historical builds are K closest neighbors to the regressed build. The one or more computer processors predict an elapsed time of the one or more profiled regression tests utilizing a KNN algorithm comprising the K closest neighbors each weighted by a corresponding average distance from a test point and the elapsed time as a target variable. The one or more computer processors responsive to the predicted elapsed time exceeding an actual elapsed time associated with the regressed build, determine that the regressed build is an actual regression. The one or more computer processors responsive to determining that the regressed build is not due to variability, apply one or more mitigation actions to the regressed build based on one or more similar historical builds.

BRIEF DESCRIPTION OF THE DRAWINGS

FIG. 3 illustrates an exemplary table, in accordance with an embodiment of the present invention;

DETAILED DESCRIPTION

Traditionally, organizations perform a plurality of evaluations and tests for software release (e.g., alpha, beta, release candidate, etc.) comprising running a plurality of performance and edge-case workloads on one or more builds (i.e., continuous integration and continuous deployment). Responsive to the completion of the plurality of evaluations and tests, traditional systems record diagnostics and utilize statistical functions to compare diagnostical results with historical results (e.g., baseline) and to determine potential regressions. Traditional systems are limited to only a subset of diagnostic result comparisons, for example, said systems may only consider central processing statistics in a limited temporal period due to computational constraints by limitations of the system. Additionally, said traditional systems utilize substantial computational resources to identify and compute a baseline and/or associated thresholds.

Embodiments of the present invention predict a likelihood that a potential regression (i.e., regressed test, build, software, etc.) is subject to variability or an actual regression (i.e., not subject to variability). Embodiments of the present invention conduct one or more probabilistic tests on elapsed time of one or more query executions on one or more baseline builds and a regressed build. Embodiments of the present invention associated one or more dynamic threshold for each project, build, module, or submodule. Embodiments of the present invention recognize that threshold determination is critical for efficient integration and deployment of software. Embodiments of the present invention reduce false positives alerts and allow for efficient testing, modification, and subsequent deployment of approved (e.g., no regression or a determined false positive) software. Embodiments of the present invention, responsive to a regression alert, initiates a mitigation action. Implementation of embodiments of the invention may take a variety of forms, and exemplary implementation details are discussed subsequently with reference to the Figures.

The present invention will now be described in detail with reference to the Figures.

Figure 1:
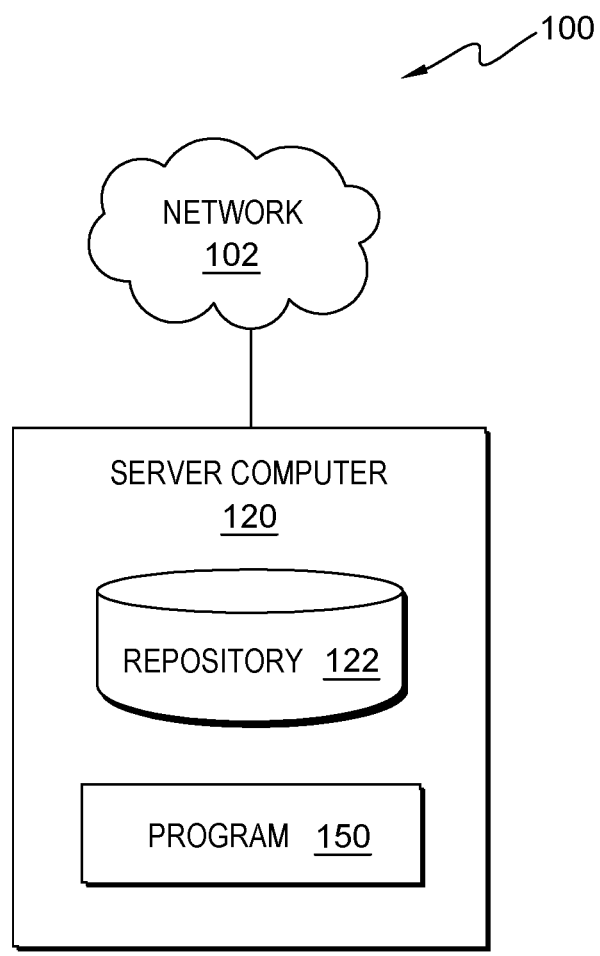
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes repository 122 and program 150. In other embodiments, server computer 120 may contain other applications, databases, programs, etc. which have not been depicted in computational environment 100. In an embodiment, server computer 120 is a source code management system and/or CI/CD system. Server computer 120 may include internal and external hardware components, as depicted and described in further detail with respect to FIG. 6.

Repository 122 is a repository for data used by program 150. In the depicted embodiment, repository 122 resides on server computer 120. In another embodiment, repository 122 may reside elsewhere within computational environment 100 provided program 150 has access to repository 122. A database is an organized collection of data. Repository 122 can be implemented with any type of storage device capable of storing data and configuration files that can be accessed and utilized by program 150, such as a database server, a hard disk drive, or a flash memory. In an embodiment, repository 122 stores data used by program 150, such as historical tests, testcases, modules, associated profilers, thresholds, etc. In an embodiment, repository 122 is a source code management system allowing a plurality of users the ability to push code into the system and allow other users to view and download contained codebases. In another embodiments, pushed code and/or software is automatically tested for errors and potential regressions. In an embodiment, the source code management system stores data used by program 150, such as historical codebases and associated revisions.

Program 150 is a program for predicting and mitigating performance variability in regression testing. In various embodiments, program 150 may implement the following steps: identifying one or more similar, historical regression tests and historical builds utilizing a computed similarity measure between a regressed build and one or more historical builds conducted on a same release cycle, wherein the identified one or more similar historical regression tests and historical builds are K closest neighbors to the regressed build; predicting an elapsed time of the one or more profiled regression tests utilizing a KNN algorithm comprising the K closest neighbors each weighted by a corresponding average distance from a test point and the elapsed time as a target variable; responsive to the predicted elapsed time exceeding an actual elapsed time associated with the regressed build, determining that the regressed build is an actual regression; responsive to determining that the regressed build is not due to variability, applying one or more mitigation actions to the regressed build based on one or more similar historical builds. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. Program 150 is depicted and described in further detail with respect to FIG. 2.

The present invention may contain various accessible data sources, such as repository 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
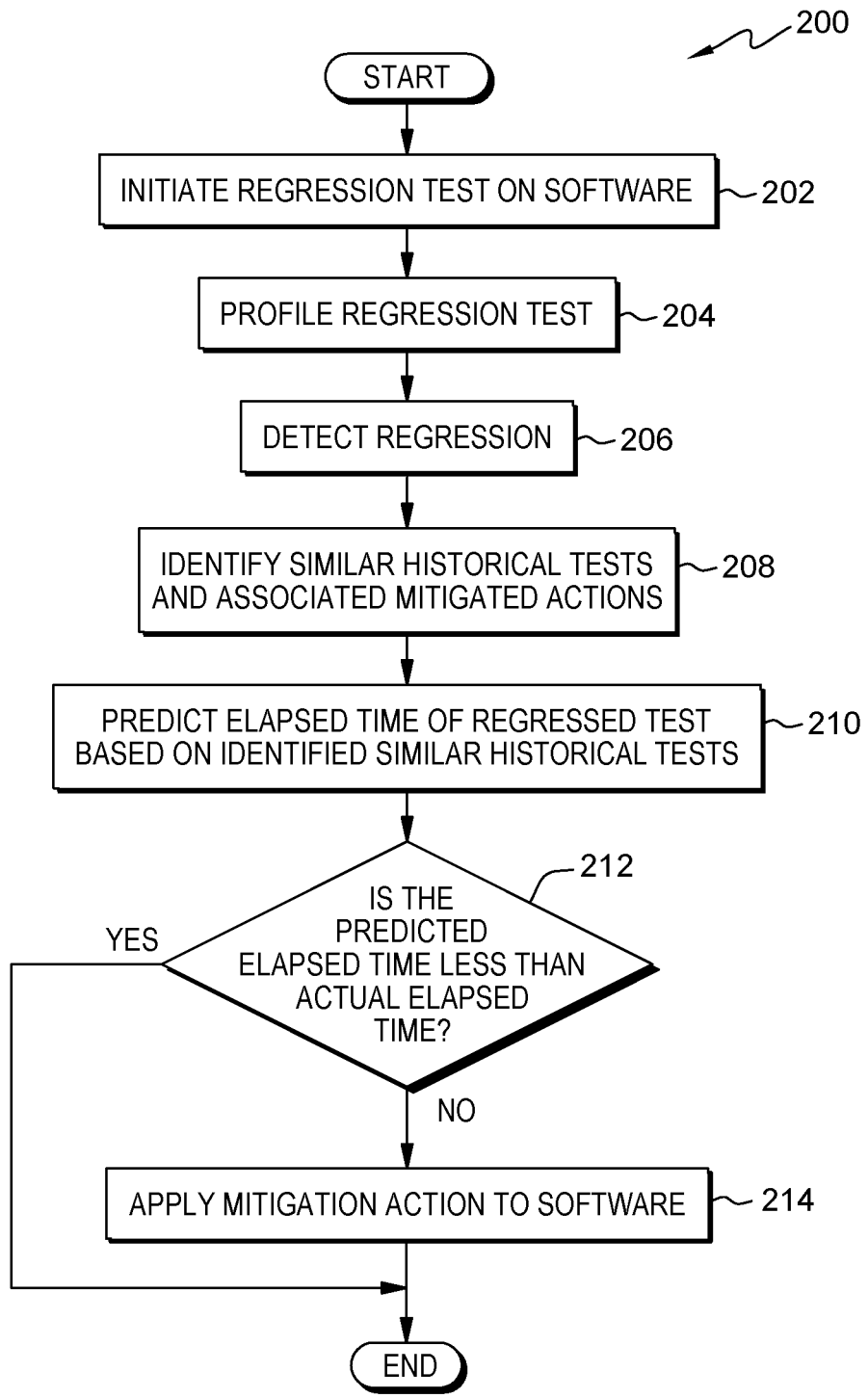
FIG. 2 is a flowchart depicting operational steps of a program, on a server computer within the computational environment of FIG. 1, for predicting and mitigating variability in regression testing, in accordance with an embodiment of the present invention.

FIG. 2 depicts flowchart 200 illustrating operational steps of program 150 for predicting and mitigating variability in regression testing, in accordance with an embodiment of the present invention.

Program 150 initiates a regression test on software (step 202). Program 150 initiates one or more evaluation, regression, unit, functional, and performance tests, hereinafter tests, on one or more software, modules, applications, functions, queries, containers, codebases, deployments, and/or sections of code, hereinafter software. In an embodiment, program 150 monitors a source code management system (e.g., repository 122) or is notified by said system responsive to pushed, modified, and/or stored software. In various embodiments, program 150 acts as an inline proxy and/or a transparent proxy 'sitting' in between a computing device (not depicted) and the destination server (i.e., server computer 120). In another embodiment, program 150 monitors a git client or server to determine a push or code modification to/from a source code management system. In an embodiment, program 150 identifies a pushed or pulled codebase and pauses, delays, suspends, or halts the git action (i.e., push or pull) or subsequent software deployments. In various embodiments, program 150 receives a notification, regarding a pushed, stored, or pulled build, and associated information (e.g., code metadata, dependencies, associated tests, etc.). In an embodiment, program 150, automatically, retrieves all associated historical builds contained, referenced, or stored within a source code management system.

Program 150 profiles the regression test (step 204). Responsive to program 150 initiating one or more regression tests, program 150 profiles (e.g., monitors, scans, etc.) said tests. For example, program 150 records memory and CPU statistics associated with one or more tests on the software, specifically modified database queries. In another example, program 150 profiles for time complexity, frequency/duration of one or more function calls. In an embodiment, program 150 profiles the tests utilizing binary tools such as a code profiler (e.g., event-based, statistical, instrumented, and simulation methods). In this embodiment, program 150 utilizes monitoring tools to gain deep insights (e.g., statistical insights), where said tools include operating system monitoring tools (e.g., vmstat for monitoring CPU utilization) and profiling tools, such as CPU profiling that monitor a plurality of associated CPU statistics (e.g., execution time, temperature, minimum utilized CPU, maximum utilized CPU, average CPU, memory utilization, system temperatures, etc.) for example profiling database functions (e.g., oprofile). In various embodiments, program 150 utilizes system profiling which includes CPU profiling, GPU profiling, input/output profiling, and network profiling. In various embodiments, diagnostics such as CPU profiler data or vmstat are transformed or modified as generated or received. For example, program 150 filters one or more results generated from a CPU profiler, where only database functions that were called during a specific query execution are retained. In a further embodiment, program 150 reduces results and associated dimensionality by aggregating data points, for example aggregating CPU ticks spent in functions based on a specified component. In another example, program 150 creates a result table with a column for each component name. In this example, program 150 updates the result table such that program 150 only modifies a row for each test. In a further example, program 150 reduces dimensionality by dropping all columns that have constant value for all rows, such as a "NULL".

Program 150 detects a regression (step 206). In an embodiment, program 150 detects a potential regression based on monitored profiler data during the one or more conducted tests, as described in step 204. In an embodiment, program 150 detects a regressed test and associated build utilizing a general regression threshold. In this embodiment, program 150 flags a regression if one or more test points (e.g., data points generated from profiling) exceeds said general regression threshold. In another embodiment, program 150 receives an alert or notification from a profiler utilizing one or more tests cases regarding a potential regression (i.e., regressed build). In various embodiments, program 150 compares ongoing testing data in order to identify potential regressions, for example program 150 flags all tests that deviate 5% from a baseline (e.g., historical average, etc.) or threshold. In this embodiment, program 150 utilizes an inclusive (e.g., allowing a plurality of potential regressions) threshold allowing program 150 to dynamically adjust subsequent thresholds and analyze potential regression.

Program 150 identifies similar historical tests and associated mitigation actions (step 208). In an embodiment, program 150 identifies and determines a plurality of historical tests based on generated data from one or more profilers and associated diagnostics, responsive to detecting a regression. For example, program 150 retrieves one or more previous builds associated with the current build. In an embodiment, program 150 computes a similarity measure or score (e.g., numerical value or probability) between a regressed build and all historical builds or a subset of historical of builds/tests, such as tests specific to a release cycle, set, or version. In another embodiment, program 150 generates the similarity score from diagnostic results such as CPU, graphics processing unit (GPU), system, networking, database, memory profiler statistics. In a further embodiment, program 150 weighs distinct profiler statistics based on a correlation between the diagnostic result and regression. In an embodiment, program 150 utilizes a non-parametric algorithm to compute a similarity measure (e.g., Euclidean distance) between a test sample (i.e., regressed build/test) and all training samples (i.e., historically similar builds/tests). In various embodiments, program 150 computes the similarity measure utilizing the regressed build/run and all past builds/runs on the same release based on CPU profiler statistics. In various embodiments, program 150 determines that a historical test and build are similar by exceeding a similarity threshold based on associated data. In another embodiment, program 150 determines that all historical tests and builds in the same release cycle as similar.

Program 150 predicts an elapsed time of the regressed test based on the identified similar historical tests (step 210). In an embodiment, program 150 utilizes the identified similar historical tests and associated profiles, as described in step 208, to predict and/or generate an elapsed time for the current test and associated build. In another embodiment, program 150 utilizes any identified historical test with a similarity score greater than a (i.e., exceeding) specified similarity score threshold (e.g., 75% similarity) or K closest neighbors (e.g., K=5) to predict the target variable and/or the dependent variable of the current test. In this embodiment, program 150 utilizes profiler data as an input to a KNN with elapsed time is the target variable. In another embodiment, program 150 utilizes the K closest neighbors vote to predict the elapsed time of the test each weighted by a corresponding average distance from the test point (e.g., regression data point).

In various embodiments, responsive to identifying and retrieving data associated with the determined K nearest neighbors of the regressed test, program 150 predicts the elapsed time of the regressed test, build, function, and/or query utilizing an aggregation or the average of said the K nearest neighbors. In an embodiment, program 150 utilizes a modified KNN algorithm implementing an option to eliminate a test data point (i.e. the test data point is not considered as a neighbor) which removes bias and provide an option to specify whether a mean or a median of elapsed time is utilized to predict the elapsed time of a test. This embodiment improves prediction quality by reducing outlier neighbor impact, where outliers are affected and compounded by variability. In an embodiment, program 150 prioritizes (e.g., applies greater weight) median utilization over mean utilization.

In various embodiments, program 150 dynamically adjusts one or more thresholds critical to detecting regressions and degradations. In an example, program 150 modifies (i.e., adjusts) the one or more thresholds based on factors associated with the associated software such as code complexity, execution time, and/or system specifications. For example, program 150 finetunes (i.e., modifies) a degradation threshold to 5% of an associated baseline for software comprising long (e.g., greater (i.e., exceeding) than a timeout period (e.g., 30 seconds)) running queries. In this example, said threshold may cause variability issues (i.e., false positives) for a short running query. For example, if the query runtime is 5 seconds, an increase of 0.25 seconds causes a regression alert. In various embodiments, program 150 utilizes a plurality of thresholds to further segment and analyze potential regressions.

If the predicted elapsed time less (not exceeding) than actual elapsed time ("yes" branch, decision block 212), then program 150 ends. In an embodiment, program 150 determines that the regression (i.e., the regressed test) was subject to variability (i.e., false positive) and program 150 suspends, ends, releases isolated code, containerizes, packages, and/or deploys the software to one or more environments (e.g., servers, clouds, etc.). Responsively, program 150 determines, with high confidence (e.g., >95%), that the regression is due to variability, thus needing no further analysis.

If the predicted elapsed time greater than the actual elapsed time, then program 150 applies a mitigation action to the software (step 214). In an embodiment, program 150 determines if the predicted elapsed time is greater than (i.e., exceeding) the actual elapsed time or greater than a regression (i.e., degradation) threshold with respect to an associated baseline, then program 150 determines, with high confidence (e.g., >95%), that the regression is not due to variability, requiring further action. Responsively, program 150 performs one or more mitigations actions based on associated diagnostic and historical actions. For example, program 150 identifies a plurality of similar historical builds, regressions, and associated mitigation actions utilized to fix said historical regression. In various embodiment, program 150 determines multiple possible mitigation actions and weighs each action based on build similarities (e.g., generated similarity scores), effectiveness, computational cost, susceptibility (e.g., susceptibility percentage) to further regression. In an embodiment, program 150 prompts a user to select a mitigation action. In another embodiments, program 150, automatically, initiates one or more mitigation actions based on an associated similarity scores and associated historical tests. In a further embodiment, program 150 recommends one or more adjustments to code such as patches or bug fixes. In another embodiment, program 150 pushes the code into isolated branch of a source code tree. In a further embodiment, program 150, concurrently, deploys a known working build in the place of the regressed build.

In an embodiment, program 150 may notify, push, and/or transmit (e.g., send,) one or more notifications to one or more computing devices (not depicted) associated a user or one or more administrators, utilizing a plurality of communication and transmission methods including, but not limited to, short message service (SMS), email, push notification, automated phone call, text-to-speech, git client warning, etc. In an embodiment, program 150 transmits data containing at least one of the following; identified confidential information, identified security vulnerabilities, associated code snippets (e.g., a section of code containing an exposed database connection string), and associated remedial actions, as described below. In various embodiments, program 150 suspends activity (e.g., retains code in an isolation area) until a response is received from a permitted user. In another embodiment, program 150 deletes and removes isolated codebases that program 150 does not receive a user response. In this embodiment, program 150 specifies a response threshold that sets a temporal period for a user response. In various embodiments, program 150 transmits a generated report, as detailed below.

In another embodiment, program 150 generates a report containing testing results and diagnostics (i.e., identified regressions, historical similarity tests and software, historical mitigation actions, generated scores, etc.). In various embodiments, program 150 constructs a document (e.g., downloadable document, spreadsheet, image, graph, etc.) containing the generated report. In this embodiment, the document is a digital or physical document (e.g., printed). In another embodiment, program 150 creates a visual representation the report, allowing a user to interact, add, modify, and/or remove one or more scans and/or tests. In yet another embodiment, program 150 presents one or more scanning and testing results on a graphical user interface (not depicted) or a web graphical user interface (e.g., generates hypertext markup language contained the generated results). Program 150 may output scanning and testing results into a plurality of suitable formats such as text files, HTML files, CSS files, JavaScript files, documents, spreadsheets, etc.

FIG. 3 depicts table 300, in accordance with an illustrative embodiment of the present invention. Table 300 is representative of a table created from one or more data mining and text analytics software applications based on the modified KNN utilized in step 210 and the identified closest neighbors identified in step 208. Table 300 contains a plurality of rows, where each row represent a regression test, where each test comprises a plurality of columns containing information regarding predicted elapsed time, actual elapsed time, and a plurality of aggregated K closest neighbors with associated computed distances (i.e., similarities). In an example, program 150 predicts an elapsed time of 16.272 and determines that the actual elapsed time was 67.948. Here, program 150 determines that the regression is a true regression and not subject to variability.

Figure 4:
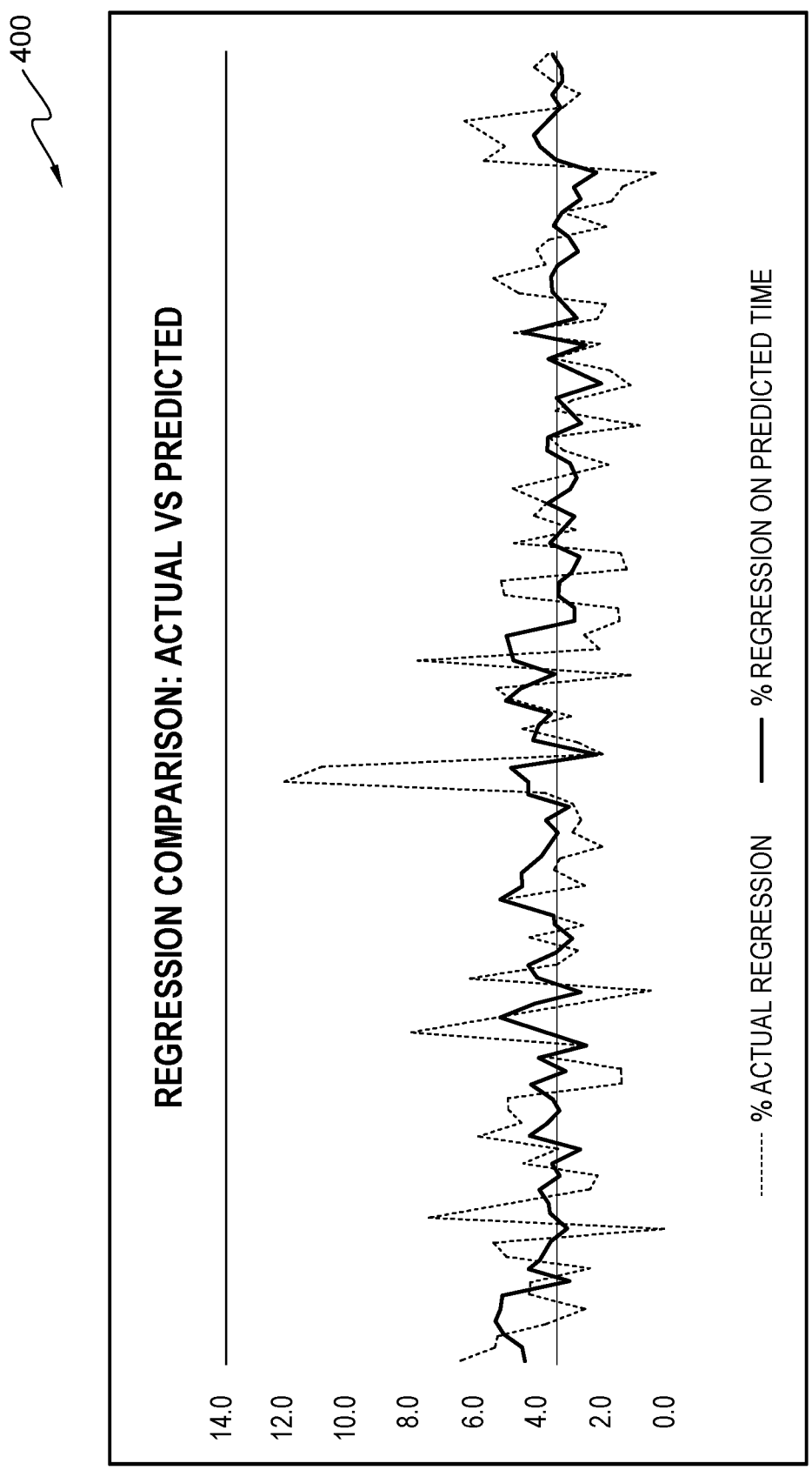
FIG. 4 illustrates an exemplary chart, in accordance with an embodiment of the present invention.

FIG. 4 depicts chart 400, in accordance with an illustrative embodiment of the present invention. Chart 400 charts compare a regression percentage specific to a database query workload for a plurality of test builds. Chart 400 illustrates actual and predicted regression values for each test point. Here, program 150 identifies that predicted elapsed time significantly has fewer fluctuations (i.e., variability) compared to actual elapsed time regressions. In an example, program 150 adjusts a regression threshold at 5% baseline deviation, thus reducing false positive occurrences.

Figure 5:
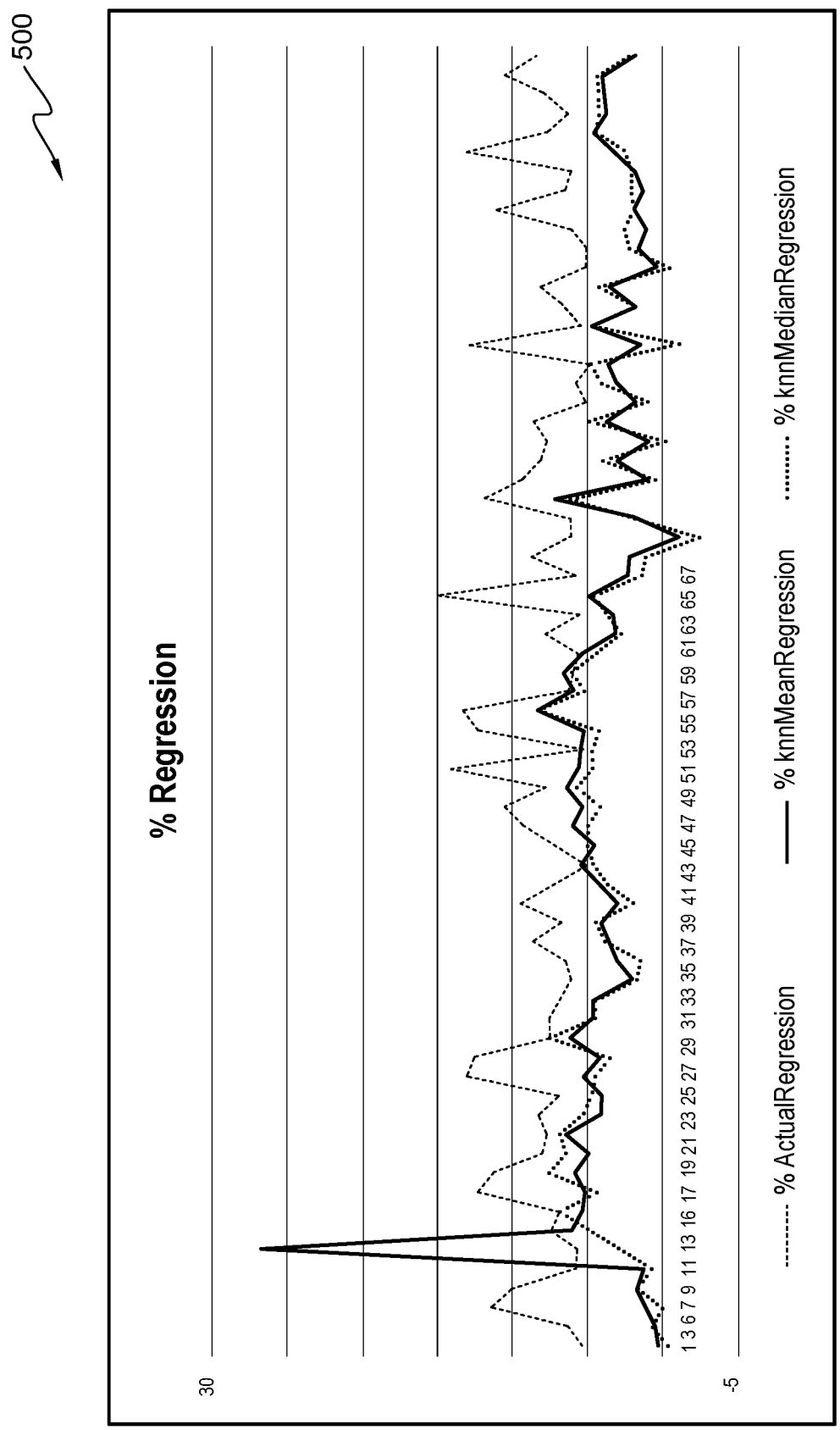
FIG. 5 illustrates an exemplary chart, in accordance with an embodiment of the present invention.

FIG. 5 depicts chart 500, in accordance with an illustrative embodiment of the present invention. Chart 500 depicts results from a mean/median prediction comparison. Chart 500 further depicts percentage degradation with respect to a baseline utilizing actual elapsed time and predicted elapsed time computed from the mean/median aggregation of the 10 nearest neighbors (e.g., K=10). Chart 500 demonstrates that predicted elapsed times are less volatile compared to actual elapsed time. Chart 500 further demonstrates that predicted elapsed time based on mean/median follow similarly. Chart 500 shows that with a degradation threshold of >=5%, mean based predictions flagged 21/68 degradations as actual regressions, while median based predictions only flagged 12/68.

Figure 6:
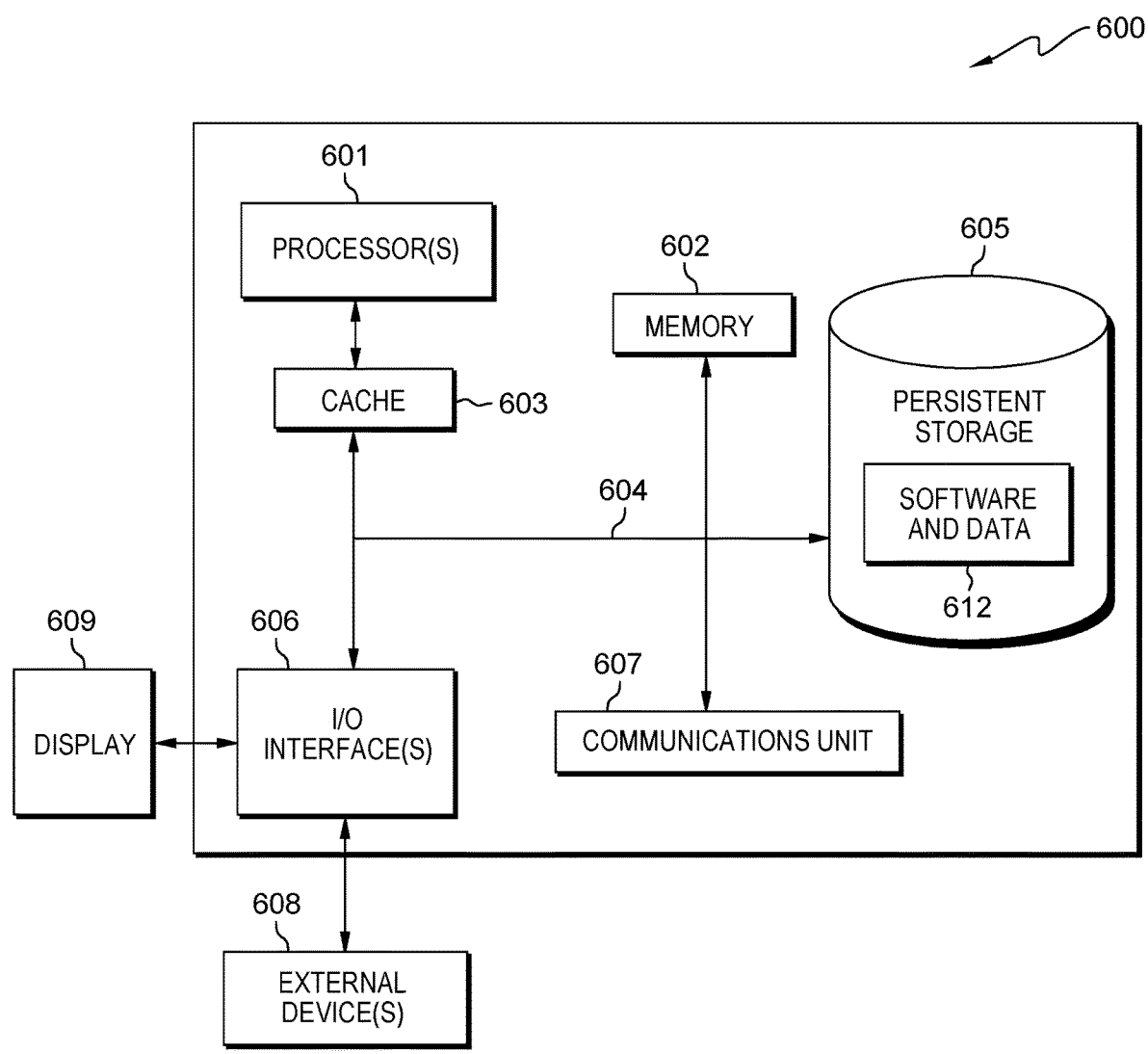
FIG. 6 is a block diagram of components of the server computer, in accordance with an embodiment of the present invention.

FIG. 6 depicts a block diagram 600 illustrating components of server computer 120 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Server computer 120 each include communications fabric 604, which provides communications between cache 603, memory 602, persistent storage 605, communications unit 607, and input/output (I/O) interface(s) 606. Communications fabric 604 can be implemented with any architecture designed for passing data and/or control information between processors (such as microprocessors, communications, and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random access memory (RAM). In general, memory 602 can include any suitable volatile or non-volatile computer readable storage media. Cache 603 is a fast memory that enhances the performance of computer processor(s) 601 by holding recently accessed data, and data near accessed data, from memory 602.

Program 150 may be stored in persistent storage 605 and in memory 602 for execution by one or more of the respective computer processor(s) 601 via cache 603. In an embodiment, persistent storage 605 includes a magnetic hard disk drive. Alternatively, or in addition to a magnetic hard disk drive, persistent storage 605 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605. Software and data 612 can be stored in persistent storage 605 for access and/or execution by one or more of the respective processors 601 via cache 603.

Communications unit 607, in these examples, provides for communications with other data processing systems or devices. In these examples, communications unit 607 includes one or more network interface cards. Communications unit 607 may provide communications through the use of either or both physical and wireless communications links. Program 150 may be downloaded to persistent storage 605 through communications unit 607.

I/O interface(s) 606 allows for input and output of data with other devices that may be connected to server computer 120. For example, I/O interface(s) 606 may provide a connection to external device(s) 608, such as a keyboard, a keypad, a touch screen, and/or some other suitable input device. External devices 608 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 605 via I/O interface(s) 606. I/O interface(s) 606 also connect to a display 609.

Display 609 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG) illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   detecting a client pushing a first software build to a code management system;
   responsive to the detected client pushing the first software build, regression testing, by one or more computer processors, the first software build;
   profiling a central processing unit (CPU) associated with the regression testing of the first software build, wherein profiling monitors CPU execution time, CPU temperature, minimum utilized CPU, maximum utilized CPU, average CPU, and memory utilization;
   responsive to a detected regression in the first software build, identifying one or more historical regression tests and one or more historical software builds conducted on a same release cycle utilizing a computed similarity measure between the first software build and the one or more historical software builds, wherein the identified one or more historical regression tests and historical software builds are K nearest neighbors (KNN) to the first software build, wherein the similarity measure is computed utilizing CPU profiling;
   predicting an elapsed time of the regression test utilizing a KNN algorithm comprising the K nearest neighbors each weighted by a corresponding average distance from a test point and the elapsed time as a target variable;
   responsive to the predicted elapsed time exceeding an actual elapsed time associated with the first software build, determining that the detected regression is an actual regression; and
   responsive to determining that the detected regression is not due to variability, mitigating the first software build based on mitigation actions associated with the one or more identified historical software builds.

2. The method of claim 1, wherein predicting the elapsed time of the regression tests utilizing the KNN algorithm comprising the K nearest neighbors and the elapsed time as the target variable, further comprises:
   Modifying the KNN algorithm to remove test point bias by removing test points not associated with the K closest neighbors.

3. The method of claim 1, wherein predicting the elapsed time of the regression tests utilizing the KNN algorithm comprising the K nearest neighbors and the elapsed time as the target variable, comprises:
   Predicting the elapsed time utilizing a mean of the K nearest neighbors.

4. The method of claim 1, wherein predicting the elapsed time of the regression tests utilizing the KNN algorithm comprising the K nearest neighbors and the elapsed time as the target variable, comprises:
   Predicting the elapsed time utilizing a median of the K nearest neighbors.

5. The method of claim 1, further comprising:
responsive to the predicted elapsed time not exceeding the actual elapsed time associated with the first software build, determining that a regressed build is due to variability; and
responsive to the determining that a regressed build is due to variability, deploying the first software build to one or more environments.

6. The method of claim 1, wherein the computed similarity is based on system profiler statistics.

7. The method of claim 6, wherein the system profiler statistics include CPU profiling, GPU profiling, input/output profiling, and network profiling.

8. The method of claim 7, wherein the CPU profiling generates statistics that include execution time, temperature, minimum CPU utilization, maximum CPU utilization, media CPU utilization, average CPU utilization, and associated memory utilization.

9. The method of claim 1, wherein the computed similarity utilizes Euclidean distance.

10. A computer program product comprising:
one or more computer readable storage media and program instructions stored on the one or more computer readable storage media, the stored program instructions comprising:
program instructions to detect a client pushing a first software build to a code management system;
program instructions to, responsive to the detected client pushing the first software build, responsive to the detected client pushing the first software build, regression test the first software build;
program instructions to suspend the pushing of the first software build;
program instructions to profile a central processing unit (CPU) associated with the regression testing of the first software build, wherein profiling monitors CPU execution time, CPU temperature, minimum utilized CPU, maximum utilized CPU, average CPU, and memory utilization;
program instructions to, responsive to a detected regression in the first software build, identify one or more historical regression tests and one or more historical software builds conducted on a same release cycle utilizing a computed similarity measure between the first software build and the one or more historical software builds, wherein the identified one or more historical regression tests and historical software builds are K nearest neighbors (KNN) to the first software build, wherein the similarity measure is computed utilizing CPU profiling;
program instructions to predict an elapsed time of the regression test utilizing a KNN algorithm comprising the K nearest neighbors each weighted by a corresponding average distance from a test point and the elapsed time as a target variable;
program instructions to responsive to the predicted elapsed time exceeding an actual elapsed time associated with the first software build, determine that the detected regression is an actual regression; and
program instructions to responsive to determining that the detected regression is not due to variability, mitigate the first software build based on mitigation actions associated with the one or more identified historical software builds.

11. The computer program product of claim 10, wherein the program instructions to predict the elapsed time of the regression tests utilizing the KNN algorithm comprising the K nearest neighbors and the elapsed time as the target variable, further comprise:
program instructions to modify the KNN algorithm to remove test point bias by removing test points not associated with the K closest neighbors.

12. The computer program product of claim 10, wherein the program instructions to predict the elapsed time of the regression tests utilizing the KNN algorithm comprising the K nearest neighbors and the elapsed time as the target variable, further comprise:
program instructions to predict the elapsed time utilizing a mean of the K nearest neighbors.

13. The computer program product of claim 10, wherein the program instructions to predict the elapsed time of the regression tests utilizing the KNN algorithm comprising the K nearest neighbors and the elapsed time as the target variable, further comprise:
program instructions to predict the elapsed time utilizing a median of the K nearest neighbors.

14. The computer program product of claim 10, wherein the computed similarity is based on system profiler statistics.

15. A computer system comprising:
one or more computer processors;
one or more computer readable storage media; and
program instructions stored on the computer readable storage media for execution by at least one of the one or more processors, the stored program instructions comprising:
program instructions to detect a client pushing a first software build to a code management system;
program instructions to, responsive to the detected client pushing the first software build, regression test the first software build;
program instructions to profile a central processing unit (CPU) associated with the regression testing of the first software build, wherein profiling monitors CPU execution time, CPU temperature, minimum utilized CPU, maximum utilized CPU, average CPU, and memory utilization;
program instructions to, responsive to a detected regression in the first software build, identify one or more historical regression tests and one or more historical software builds conducted on a same release cycle utilizing a computed similarity measure between the first software build and the one or more historical software builds, wherein the identified one or more historical regression tests and historical software builds are K nearest neighbors (KNN) to the first software build, wherein the similarity measure is computed utilizing CPU profiling;
program instructions to predict an elapsed time of the regression test utilizing a KNN algorithm comprising the K nearest neighbors each weighted by a corresponding average distance from a test point and the elapsed time as a target variable;
program instructions to responsive to the predicted elapsed time exceeding an actual elapsed time associated with the first software build, determine that the detected regression is an actual regression; and
program instructions to responsive to determining that the detected regression is not due to variability, mitigate the first software build based on mitigation actions associated with the one or more identified historical software builds.

16. The computer system of claim 15, wherein the program instructions to predict the elapsed time of the regression tests utilizing the KNN algorithm comprising the K nearest neighbors and the elapsed time as the target variable, further comprise:
    program instructions to modify the KNN algorithm to remove test point bias by removing test points not associated with the K closest neighbors.

17. The computer system of claim 15, wherein the program instructions to predict the elapsed time of the regression tests utilizing the KNN algorithm comprising the K nearest neighbors and the elapsed time as the target variable, further comprise:
    program instructions to predict the elapsed time utilizing a mean of the K nearest neighbors.

18. The computer system of claim 15, wherein the program instructions to predict the elapsed time of the regression tests utilizing the KNN algorithm comprising the K nearest neighbors and the elapsed time as the target variable, further comprise:
    program instructions to predict the elapsed time utilizing a median of the K nearest neighbors.

19. The computer system of claim 15, wherein the computed similarity is based on system profiler statistics.

20. The computer system of claim 15, wherein the computed similarity utilizes Euclidean distance.

* * * * *